United States Patent
Lee et al.

(10) Patent No.: US 12,246,616 B2
(45) Date of Patent: Mar. 11, 2025

(54) SYSTEMS AND METHODS FOR PROVIDING ENERGY MANAGEMENT SERVICE LINKED WITH AUTONOMOUS DRIVING

(71) Applicant: LG Energy Solution, Ltd., Seoul (KR)

(72) Inventors: Jin Woo Lee, Daejeon (KR); Sung Soo Hong, Daejeon (KR); Dong Myung Kim, Daejeon (KR); Hyuk Sung Chung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/502,615

(22) Filed: Nov. 6, 2023

(65) Prior Publication Data
US 2024/0375543 A1 Nov. 14, 2024

(30) Foreign Application Priority Data

May 11, 2023 (KR) .......................... 10-2023-0061372
Sep. 5, 2023 (KR) .......................... 10-2023-0117973

(51) Int. Cl.
*B60L 58/13* (2019.01)
*B60L 58/24* (2019.01)

(52) U.S. Cl.
CPC ............... *B60L 58/13* (2019.02); *B60L 58/24* (2019.02); *B60L 2240/10* (2013.01); *B60L 2240/642* (2013.01)

(58) Field of Classification Search
CPC ...... B60L 58/13; B60L 58/24; B60L 2240/10; B60L 2240/642
See application file for complete search history.

(56) References Cited

U.S. PATENT DOCUMENTS

| | | |
|---|---|---|
| 2006/0284618 A1 | 12/2006 | Cho et al. |
| 2014/0218041 A1 | 8/2014 | Cho et al. |
| 2016/0276935 A1* | 9/2016 | Arai ...................... B60L 3/0023 |
| 2019/0248252 A1* | 8/2019 | Jin .......................... B60L 58/12 |
| 2019/0334371 A1* | 10/2019 | Watanabe ............. B60W 10/08 |
| 2021/0339650 A1 | 11/2021 | Hashimoto et al. |
| 2022/0105829 A1 | 4/2022 | Nakagawa |
| 2022/0137149 A1* | 5/2022 | Chueh ..................... B60L 58/12 |
| | | 702/63 |
| 2022/0200311 A1* | 6/2022 | Oonishi .................. H02J 9/061 |

(Continued)

FOREIGN PATENT DOCUMENTS

| | | |
|---|---|---|
| JP | 7199022 B2 | 1/2023 |
| KR | 20060122718 A | 11/2006 |

(Continued)

*Primary Examiner* — James M McPherson
*Assistant Examiner* — Kyle J Kingsland
(74) *Attorney, Agent, or Firm* — Lerner David LLP (57) ABSTRACT

A computing system according to at least one embodiment disclosed herein includes an autonomous driving controller that controls autonomous driving of a vehicle, and an energy management unit that provides a service related to energy management of the vehicle. The autonomous driving controller may set an output of a driving system included in the vehicle. The energy management unit may determine a change in an internal resistance of a battery based on driving data of the vehicle and battery data of the battery included in the vehicle, and sets an output current of the battery for the set output based of the driving system based on the determined change in the internal resistance.

18 Claims, 8 Drawing Sheets

(56) References Cited

U.S. PATENT DOCUMENTS

| | | | |
|---|---|---|---|
| 2022/0283237 A1* | 9/2022 | Kondo | G01R 31/3842 |
| 2022/0289072 A1 | 9/2022 | Jeon | |
| 2023/0013714 A1 | 1/2023 | Lee et al. | |
| 2023/0084461 A1 | 3/2023 | Koehler et al. | |

FOREIGN PATENT DOCUMENTS

| | | | |
|---|---|---|---|
| KR | 20170096409 A | 8/2017 | |
| KR | 20220128531 A | 9/2022 | |
| KR | 20230008518 A | 1/2023 | |
| KR | 102496195 B1 | 2/2023 | |

* cited by examiner

SYSTEMS AND METHODS FOR PROVIDING ENERGY MANAGEMENT SERVICE LINKED WITH AUTONOMOUS DRIVING

CROSS-REFERENCE TO RELATED APPLICATION

This application claims the benefit under 35 U.S.C. § 119 (a) of a Korean patent application filed on May 11, 2023 in the Korean Intellectual Property Office and assigned Serial number 2023-0061372 and a Korean patent application filed on Sep. 5, 2023 in the Korean Intellectual Property Office and assigned Serial number 2023-0117973, the entire disclosure of which is hereby incorporated by reference.

TECHNICAL FIELD

The disclosure relates to a computing system providing an energy management service linked with autonomous driving, a method of operating the computing system, and a vehicle.

BACKGROUND

As the demand for eco-friendly vehicles increases, electric vehicles (EVs), which use batteries such as lithium-ion secondary batteries as an energy source, are rapidly replacing vehicles having existing internal combustion engines. Meanwhile, as artificial intelligence technology and various sensor technologies are advanced, research and development for improving the performance of hardware and software related to an autonomous driving system are also being actively conducted. Accordingly, the autonomous driving system for supporting autonomous driving of a vehicle has been developed or provided in the form of autonomous driving platforms including various sensors and controllers. Some electric vehicle manufacturers are mass-producing or developing autonomous driving electric vehicles based on the autonomous driving platforms.

Energy management of the vehicle is important to further advance autonomous driving technologies of electric vehicles. In this regard, events that determines various behaviors and driving scenarios may occur during the autonomous driving of a vehicle. These events are inevitably closely related to energy consumption or energy management. However, in the case of a general electric vehicle, an energy management function is not provided or an energy management aspect is not considered at all.

Autonomous driving platforms that performs autonomous driving control are typically not in communication with systems that control energy management of the battery. As such, battery output current is set without considering energy loss caused by a change of a driving environment or a driving condition in an autonomous driving process. For example, because the energy loss due to the driving environment or the driving condition is not precisely grasped, the battery output current is conservatively set to a very high level or the battery output current is adjusted ex post facto after the change of the driving environment or the driving condition. Thus, the energy of the battery is consumed inefficiently, resulting in more emissions and/or greenhouse gases being produced during the production of the energy. Such emissions and/or greenhouse gases may adversely affect the environment, such as by leading to climate change.

SUMMARY

An aspect of the disclosure is to provide a computing system that may control autonomous driving and provide an energy management service based on battery data, a method of operating the computing system, and a vehicle. The energy management functions may facilitate more control of power provided by a battery to the autonomous driving system. Such energy management functions may improve the overall energy efficiency of the vehicle, thereby leading to reduced energy use. Furthermore, the energy management functions can be implemented in the automated vehicle platforms of many types of vehicles, leading to widespread improvements in energy efficiency.

Another aspect of the disclosure is to provide a computing system that may set an output current of a battery in consideration of a change in an internal resistance of the battery according to a driving environment and/or a driving condition of a vehicle, a method of operating the computing system, and a vehicle.

The technical objectives of embodiments of the disclosure are not limited to the aforementioned problems, and any other technical problems not mentioned herein will be clearly understood from the following description by those skilled in the art to which the disclosure pertains.

An aspect of the disclosure may include a computing system. The computing system may include an autonomous driving controller and an energy management unit. The autonomous driving controller may be configured to control autonomous driving of a vehicle, including setting an output of a driving system of the vehicle. The energy management unit may be configured to determine a change in an internal resistance of a battery included in the vehicle based on driving data of the vehicle and battery data of the battery, and set an output current of the battery for the set output of the driving system based on the determined change in the internal resistance.

In some instances, the energy management unit may be configured to determine a degree of energy loss due to the determined change in the internal resistance, wherein setting the output current is further based on the determined degree of energy loss. In some examples, the energy management unit may be further configured to set the output current higher when the determined degree of energy loss increases. In some examples, the energy management unit may be further configured to set a preliminary output current of the battery corresponding to the set output of the driving system using a current map in which a plurality of output values of the driving system and a plurality of output current values of the battery are mapped, set an additional output current of the battery based on the predicted degree of the energy loss, and set the output current as a sum of the preliminary output current and the additional output current.

In some instances, the energy management unit may be further configured to predict a change in a temperature of the battery based on the driving data of the vehicle and the battery data of the battery included in the vehicle, wherein determining the change in the internal resistance of the battery is further based on the predicted change in the temperature. In some examples, the energy management unit may be further configured to determine the change in the internal resistance of the battery increases when the predicted change in the temperature of the battery increases in a temperature range of an optimum temperature or more. In some examples, the energy management unit may be further configured to determine the change in the internal resistance of the battery increases when the predicated change in the temperature of the battery decreases in a temperature range of an optimum temperature or less. In some examples, the driving data includes data related to at least one of an outside temperature of the vehicle, a slope of a road on which the vehicle drives, a surface condition of the road, or behavior data of the vehicle.

In some instances, the autonomous driving controller sets the output of the driving system of the vehicle based on the driving data and characteristic data of the vehicle. In some examples, the autonomous driving controller sets the output of the driving system using a power map in which the driving data, the characteristic data of the vehicle, and a plurality of output values of the driving system are mapped.

In some instances, the determined change in the internal resistance is a prediction of internal resistance of the battery at a future time.

Another aspect of the disclosure is directed to a method for adjusting operation of a battery of a vehicle. The method may include receiving, by one or more processors, driving data of the vehicle and battery data of the battery, determining, by the one or more processors, a change in an internal resistance of the battery included in the vehicle based on the driving data of the vehicle and the battery data of the battery, and setting, by the one or more processors, an output current of the battery for a set output of a driving system of the vehicle based on the determined change in the internal resistance.

In some instances, the method further includes determining a degree of energy loss due to the determined change in the internal resistance, wherein setting the output current is further based on the determined degree of energy loss. In some examples, the output current is set higher when the determined degree of energy loss increases.

In some instances, the method further includes setting a preliminary output current of the battery corresponding to the set output of the driving system using a current map in which a plurality of output values of the driving system and a plurality of output current values of the battery are mapped, setting an additional output current of the battery based on the predicted degree of the energy loss, and setting the output current as a sum of the preliminary output current and the additional output current.

In some instances, the method further includes predicting a change in a temperature of the battery based on the driving data of the vehicle and the battery data of the battery included in the vehicle, wherein determining the change in the internal resistance of the battery is further based on the predicted change in the temperature. In some examples, determining the change in the internal resistance of the battery increases when the predicted change in the temperature of the battery increases in a temperature range of an optimum temperature or more. In some examples, determining the change in the internal resistance of the battery increases when the predicated change in the temperature of the battery decreases in a temperature range of an optimum temperature or less. In some examples, the driving data includes data related to at least one of an outside temperature of the vehicle, a slope of a road on which the vehicle drives, a surface condition of the road, or behavior data of the vehicle.

In some instances, the method further comprises setting the output of the driving system of the vehicle based on the driving data and characteristic data of the vehicle.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, embodiments of this disclosure may be described with reference to the accompanying drawings. However, it should be understood that this disclosure is not intended to limit the specific embodiments, but includes various modifications, equivalents, and/or alternatives of the embodiments described herein.

Embodiments of the disclosure and terms used herein are not intended to limit the technical features described in the disclosure to specific embodiments, and it should be understood that the embodiments and the terms include modification, equivalent, or alternative to the corresponding embodiments described herein. With regard to the description of drawings, similar or related components may be marked by similar reference marks/numerals. The singular form of the noun corresponding to an item may include one or more of the item, unless interpreted otherwise in context.

In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first", "second", "A", "B", "(a)", or "(b)" may be used to simply distinguish the corresponding component from the other component, but do not limit the corresponding components in other aspects (e.g., importance or order) unless specifically stated to the contrary.

In this disclosure, when a component (e.g., a first component) is referred to as being "coupled with/to" or "connected with/to" another component (e.g., a second component) with or without the term of "operatively" or "communicatively", it may mean that a component is connectable to the other component, directly (e.g., by wire or wirelessly), or indirectly (e.g., through the third component).

A method according to various embodiments disclosed in the disclosure may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store, directly between two user devices, or online. In the case of on-line distribution, at least part of the computer program product may be at least temporarily stored in the machine-readable storage medium such as the memory of a manufacturer's server, an application store's server, or a relay server or may be generated temporarily.

According to embodiments disclosed in the disclosure, each component (e.g., a module or a program) of the above-described components may include a single entity or a plurality of entities, and some of the plurality of objects may be separately arranged on other components. According to embodiments disclosed in the disclosure, one or more components of the above-described components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to embodiments disclosed in the disclosure, operations executed by modules, programs, or other components may be executed by a successive method, a parallel method, a repeated method, or a heuristic method. Alternatively, at least one or more of the operations may be executed in another order or may be omitted, or one or more operations may be added.

Figure 1:
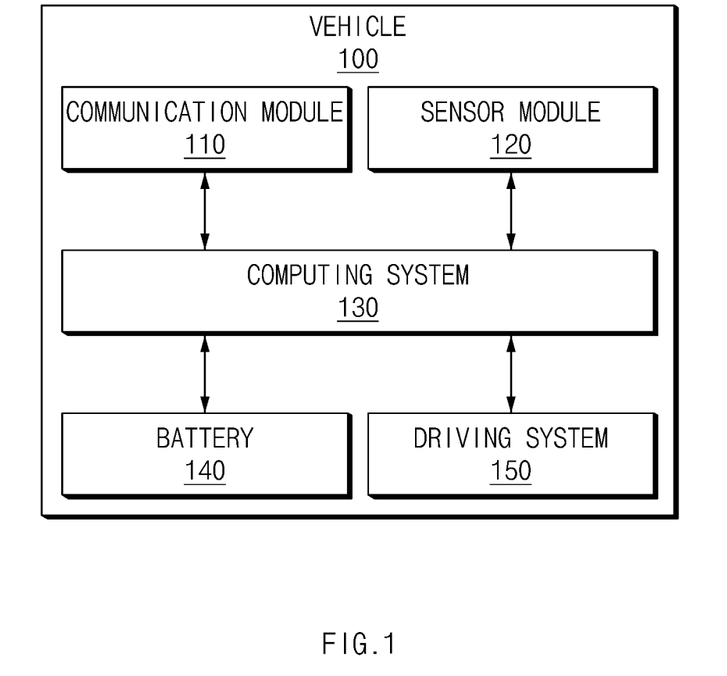
FIG. 1 is a block diagram of a vehicle according to at least one aspect of the disclosure.

FIG. 1 is a block diagram of a vehicle according to some embodiments.

Referring to FIG. 1, a vehicle 100 may include a communication module 110, a sensor module 120, a computing system 130, a battery 140, and a driving system 150. For example, the vehicle 100 may be an electric vehicle (EV) or a hybrid electric vehicle (HEV) that generates a driving force using electrical energy. Further, according to various embodiments, the vehicle 100 may include a vehicle having an autonomous driving function, and the communication module 110, the sensor module 120, and the computing system 130 may be implemented in the form of an autonomous driving platform, but the disclosure is not limited thereto.

The communication module 110 may communicate with the external electronic device. For example, the communication module 110 may establish a wired and/or wireless communication channel and exchange various pieces of data with an external electronic device through the established communication channel.

The sensor module 120 may detect objects positioned around the vehicle 100. For example, the sensor module 120 may include a camera sensor for detecting surrounding objects, a global navigation satellite system (GNSS) sensor for assisting with a mapping function, a perception function, an occupancy grid creation function and/or a route planning function, a radio detection and ranging (RADAR) sensor for detecting surrounding vehicles, an ultrasonic sensor for parking assistance and/or occupancy grid creation, a light detection and ranging (LIDAR) sensor for detection of an object and a pedestrian, emergency breaking, collision avoidance and/or other functions, an inertial measurement unit (IMU) sensor including an accelerometer, a magnetometer, a gyroscope and/or a magnetic compasses, a vibration sensor, a temperature sensor and/or a speed sensor.

The computing system 130 may overall manage an operation of the vehicle 100, a function provided by the vehicle 100, and the like. To this end, the computing system 130 may control and/or manage operations of the communication module 110, the sensor module 120, the battery 140 and/or the driving system 150.

The computing system 130 may process various calculations related to the vehicle 100 and may execute programs, software, or instructions. According to at least one embodiment, the computing system 130 may process calculations related to driving control of the vehicle 100 and/or calculations related to an energy management function. For example, the calculations related to the driving control of the vehicle 100 may include calculations for determining a driving strategy, a driving route, a behavior, or the like of the vehicle 100.

The computing system 130 may process the calculations related to the driving control of the vehicle 100 and/or the calculations related to the energy management function based on driving data of the vehicle 100 and/or battery data (e.g., voltage data, current data, temperature data and/or charging state data, a state of charge (SOC), a state of health (SOH), an accumulated charging current, an accumulated discharging current, accumulated charging power, accumulated discharging power, an insulation resistance, relay state data, or the like) indicating a state of the battery 140.

In the case of a general electric vehicle, a controller of the vehicle processes only the calculations related to the driving control, and a battery management module processes the calculations related to the energy management function. However, the computing system 130 may process all the calculations related to the driving control and the calculations related to the energy management function. According to this method, because the computing system 130 having a relatively high computational processing capability compared to a management module (e.g., a BMS 141 in FIG. 2) of the battery 140 may perform the energy management function, energy management of the vehicle 100 may be performed more stably and smoothly.

Further, some of the calculations related to the energy management function of the vehicle 100 may be processed by the computing system 130, and the other calculations may be processed by the management module of the battery 140. In this way, because the calculations related to the energy management function are distributed to the computing system 130 and the battery 140, the energy management of the vehicle 100 may be performed more stably and smoothly, and the management module provided in the battery 140 may be downgraded.

The computing system 130 may include at least one processor for processing calculations and executing instructions and an interface circuit for interacting with other elements of the vehicle 100. According to some embodiments, a communication method for the interface circuit may be a device-to-device communication method such as a bus, general purpose input and output (GPIO), a serial peripheral interface (SPI), and a mobile industry processor interface (MIPI).

At least one processor of the computing system 130 may have a structure for executing instructions for implementing processes processed inside the vehicle 100. The at least one processor may be implemented as an array of a plurality of logic gates for processing various calculations or a general-purpose microprocessor, and may be configured as a single processor or a plurality of processors. For example, the at least one processor may be implemented in the form of a microprocessor, a central processing unit (CPU), a graphic processor unit (GPU), an application processor (AP), application specific integrated process (ASIC), or combinations thereof.

The at least one processor of the computing system 130 may be configured separately from or integrally with a memory (not illustrated) configured to store instructions and may process various calculations by executing the instructions stored in the memory. The memory may store various pieces of data, instructions, mobile applications, computer programs, or the like. For example, the memory may be implemented as a non-volatile memory such as a read-only memory (ROM), a programmable read-only memory (PROM), an erasable programming read-only memory (EPROM), an electrically erasable and programmable read only memory (EEPROM), a flash memory, a phase-change random access memory (PRAM), a magnetic random access memory (MRAM), a resistance random access memory (RRAM), and a ferroelectric random access memory (FRAM) or a volatile memory such as a dynamic random access memory (DRAM), a static random access memory (SRAM), a synchronous dynamic random access memory (SDRAM), the phase-change random access memory (PRAM), the resistance random access memory (RRAM), and a ferroelectric random access memory (FeRAM) and may be implemented in the form of a hard disk drive (HDD), a solid state drive (SSD), a secure digital (SD) card, a micro-SD card or combinations thereof. In some instances, the computing system 130 may be implemented as a system-on-chip (SoC).

The battery 140 may supply power and/or electrical energy to the vehicle 100. For example, the battery 140 may be a rechargeable secondary battery that is discharged while supplying power to the vehicle 100 and is charged by a battery charging device or may be, for example, a lithium ion battery, but the disclosure is not limited thereto. According to some embodiments, the battery 140 may include a battery cell, a battery module, a battery pack, and/or a battery rack.

The driving system 150 may control driving and/or behavior of the vehicle 100. For example, the driving system 150 may control an operation of an actuator related to braking, driving, and a posture of the vehicle 100. According to some embodiments, the driving system 150 may include a braking system that controls an operation of a braking-related actuator, a posture control system that controls the operation of the actuator for maintaining a posture of a vehicle body stable, a steering system that controls the operation of the actuator for controlling a transverse behavior of the vehicle, a gear shift system that controls the operation of the actuator for automatic gear shift and/or an engine management system that controls the operation of the actuator for controlling a driving speed of the vehicle. However, the disclosure is not limited thereto.

According to some embodiments, the driving system 150 may control the driving and/or the behavior of the vehicle 100 in response to a control instruction of the computing system 130. For example, the driving system 150 may control the driving and/or the behavior of the vehicle 100 in response to the control instruction based on a calculation result (e.g., a calculation/execution result of autonomous driving software) of the computing system 130.

Hereinafter, an operation of the computing system according to some embodiments will be described with reference to FIGS. 2 to 5.

Figure 2:
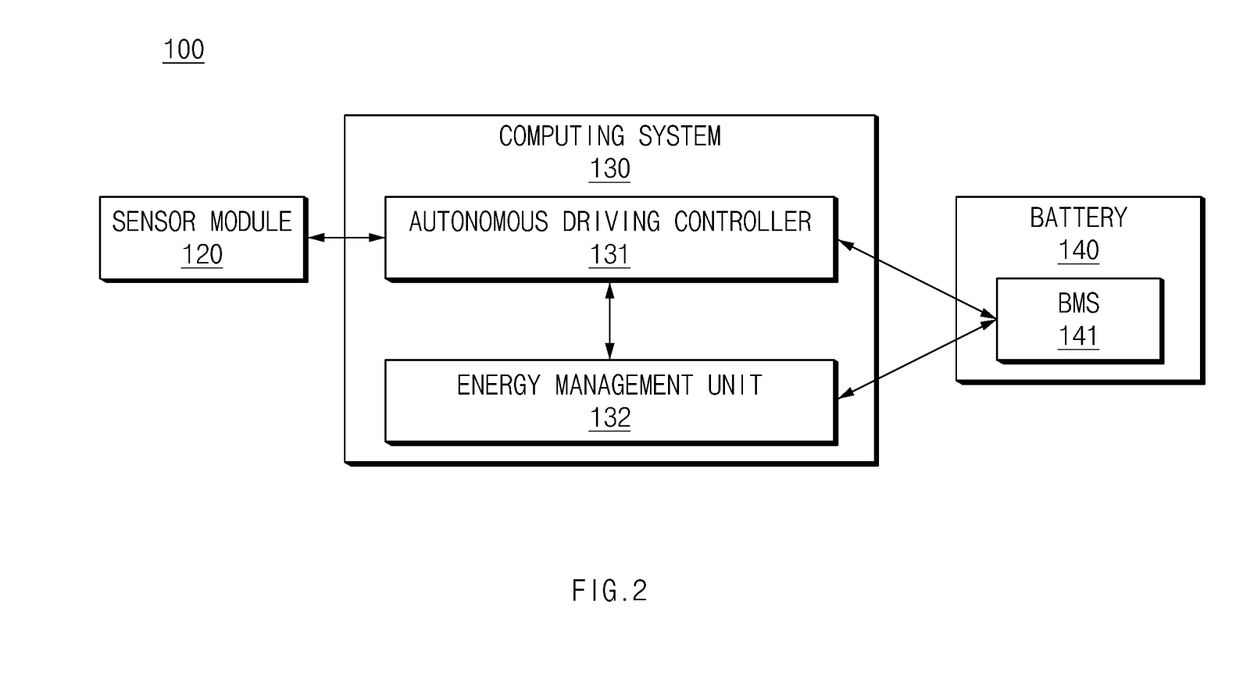
FIG. 2 is a view for describing an operation of components included in a computing system according to at least one aspect of the disclosure.
Figure 3:
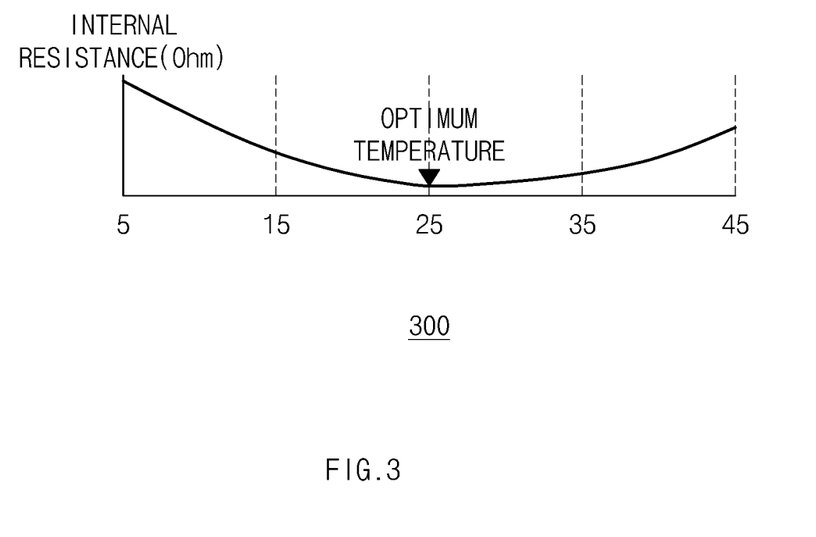
FIG. 3 is a view for describing an optimum temperature of a battery according to at least one aspect of the disclosure.
Figure 4:
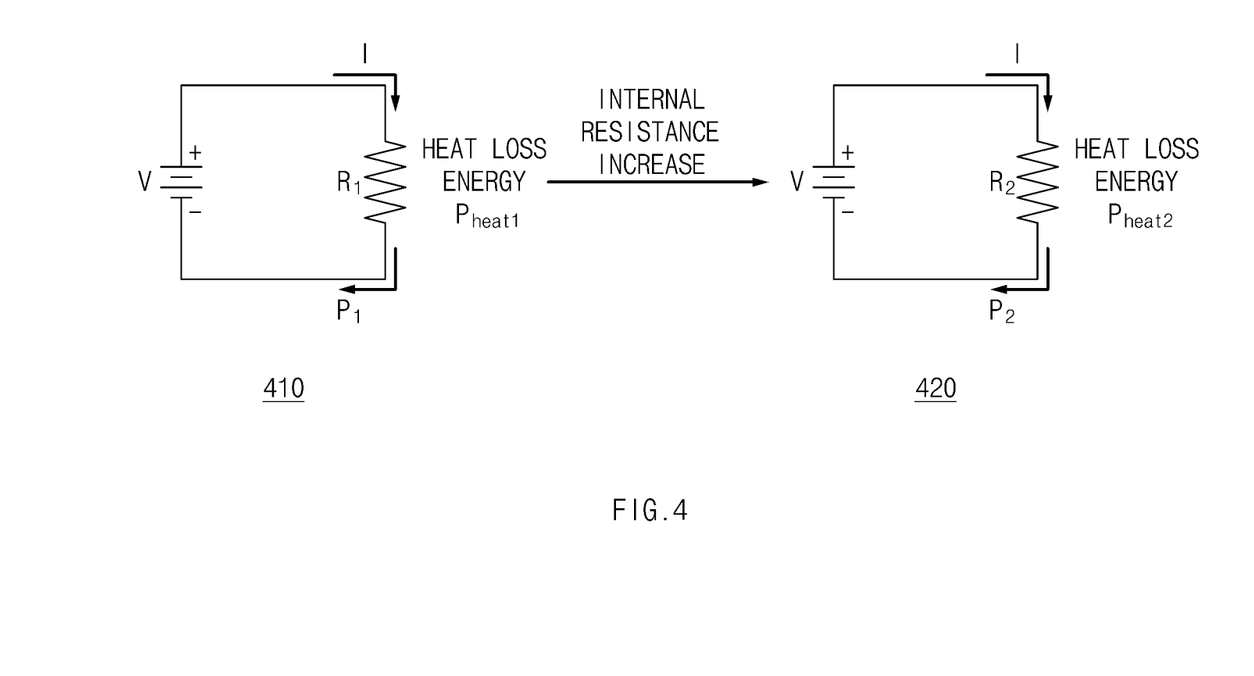
FIG. 4 is a view for describing an example in which energy loss occurs as an internal resistance of the battery increases according to at least one aspect of the disclosure.
Figure 5:
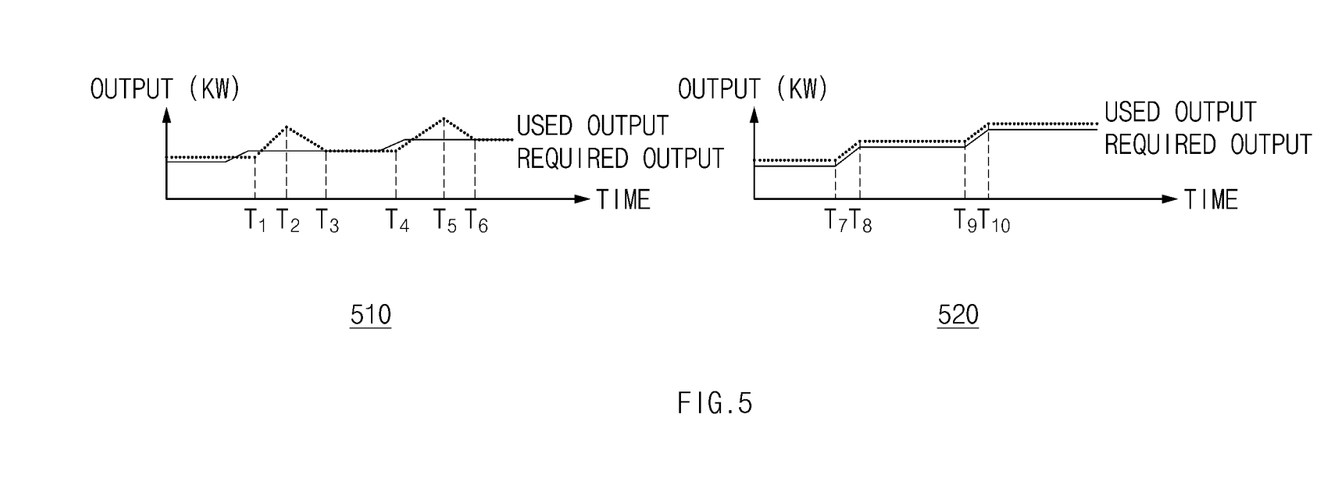
FIG. 5 is a view illustrating output power of the battery according to at least one aspect of the disclosure.

FIG. 2 is a view for describing an operation of components included in a computing system according to some embodiments. FIG. 3 is a view for describing an optimum temperature of a battery according to an embodiment. FIG. 4 is a view for describing an example in which energy loss occurs as an internal resistance of the battery increases according to some embodiments. FIG. 5 is a view illustrating output power of the battery according to some embodiments.

Referring to FIG. 2, the computing system 130 may include an autonomous driving controller 131 and an energy management unit 132.

The autonomous driving controller 131 may execute the autonomous driving software that controls autonomous driving of the vehicle 100. Here, the autonomous driving software may be stored in the memory (not illustrated) included in the computing system 130. Operations of the autonomous driving controller 131, which will be described below, may be operations performed by executing the autonomous driving software by the autonomous driving controller 131.

The autonomous driving controller 131 may acquire the driving data of the vehicle 100 from at least one vehicle module (e.g., the communication module 110 and/or the sensor module 120). The driving data may include various pieces of data related to the driving of the vehicle 100, which are acquired by the communication module 110 and/or the sensor module 120. For example, the driving data may include object data and behavior data, the object data may include the type and number of surrounding objects, a distance between the object and the vehicle 100, a position of the object with respect to the vehicle 100, a ground position, a relative speed, a ground speed, relative acceleration, ground acceleration, an outside temperature, a slope of a road on which the vehicle 100 drives, a surface condition of the road, and the like, and the behavior data may include a position, a moving path, a travel distance, a speed, acceleration, a steering angle, a yaw, a pitch, a roll, and the like of the vehicle 100.

The autonomous driving controller 131 may control the driving system 150 based on the driving data to control driving including the acceleration, deceleration, steering, and combinations thereof for the autonomous driving of the vehicle 100.

The autonomous driving controller 131 may set an output of the driving system 150 (e.g., a motor). According to some embodiments, the autonomous driving controller 131 may set the output based on the driving data and characteristic data of the vehicle 100. Here, the characteristic data of the vehicle 100 may refer to data related to characteristics (e.g., a weight, types of components, and the like) according to the type of the vehicle 100.

The autonomous driving controller 131 may set the output using a power map stored in the memory (not illustrated). The power map may be a table in which a plurality of output values of the driving system 150 are mapped with the driving data and the characteristic data. In detail, the power map may be a table in which a plurality of pieces of state information of a plurality of variables (e.g., the outside temperature, the slope of the road, the surface condition of the road, and the speed of the vehicle 100) included in the driving data and a plurality of pieces of state information of a plurality of variables (e.g., the weight and the type of the motor) included in the characteristic data are mapped with the plurality of output values of the driving system 150. For example, when the outside temperature on the power map is 35° C., the slope of the road is 15%, and the speed of the vehicle 100 is 120 km/h, the mapped output value of the driving system 150 may be "X". The autonomous driving controller 131 may set the output of the driving system 150 to "X" when a driving environment and a driving condition identified based on the driving data are as described above.

The autonomous driving controller 131 may transmit the set output of the driving system 150 to the energy management unit 132.

The autonomous driving controller 131 may acquire, from the BMS 141 included in the battery 140, the battery data (e.g., the voltage data, the current data, the temperature data, the SOC, the SOH, the accumulated charging current, the accumulated discharging current, the accumulated charging power, the accumulated discharging power, the insulation resistance, the relay state data, or the like) related to the state of the battery 140. Here, the battery 140 may include the battery cell, the battery module, the battery pack, and/or the battery rack and may include the BMS 141 for managing the battery cell, the battery module, the battery pack or the like.

The BMS 141 may manage an operation/function of the battery 140. According to some embodiments, the BMS 141 may process the calculations related to the energy management function, and in some cases, the BMS 141 may provide processing results of the calculations to the computing system 130. For example, the BMS 141 may measure a voltage, a current, a temperature, and the like of the battery 140 and generate the battery data by estimating the SOC, the SOH, and the like. According to at least one embodiment, the SOC or the SOH may be estimated not by the BMS 141 but by the energy management unit 132.

The autonomous driving controller 131 may control the driving system 150 further in consideration of the battery data to control the driving including the acceleration, the deceleration, the steering, and combinations thereof for the autonomous driving of the vehicle 100.

The autonomous driving controller 131 may transmit the battery data to the energy management unit 132.

The energy management unit 132 may execute energy management software to provide various energy management services (e.g., battery condition diagnosis, battery lifetime prediction, battery operation control, battery charging/discharging control, and the like) related to the energy management of the vehicle 100. For example, the energy management unit 132 may transmit energy management data generated by executing the energy management software to the autonomous driving controller 131 and/or the BMS 141. Here, the energy management software may be stored in the memory (not illustrated) included in the computing system 130. Operations of the energy management unit 132, which will be described below, may be operations performed by executing the energy management software by the energy management unit 132. The autonomous driving controller 131 and/or the energy management unit 132 may be implemented as one or more computer programs executed on the computing system 130. For instance, the driving controller 131 and energy management unit 132 may be distinct programs executed by the computing system 130 or a combined program executed by the computing system 130. In some instances, the autonomous driving controller 131 and/or energy management unit 132 may be implemented by processors, such as the processors of the computing system 130, other processors, and/or SoCs.

The energy management unit 132 may acquire the driving data and/or the battery data from the autonomous driving controller 131. The energy management unit 132 may directly acquire the battery data from the BMS 141.

The energy management unit 132 may set an output current of the battery 140 for the set output of the driving system 150 set by the autonomous driving controller 131.

The energy management unit 132 may predict a change in an internal resistance of the battery 140 based on the driving data and the battery data.

Referring to a graph 300 of FIG. 3, it may be identified that the internal resistance of the battery 140 changes according to the temperature of the battery 140. According to the graph 300, in a temperature range of an optimum temperature (e.g., 25° C.) or less, the internal resistance of the battery 140 may decrease as the temperature of the battery 140 becomes closer to the optimum temperature (i.e., as the temperature increases). Further in a temperature range of the optimum temperature or more, the internal resistance of the battery 140 may decrease as the temperature of the battery 140 becomes closer to the optimum temperature (i.e., as the temperature decreases).

This is because an abnormal electrochemical reaction occurring inside the battery 140 causes changes (e.g., movement degradation and/or extinction) of lithium ions when the temperature of the battery 140 decreases (or increases) in the optimum temperature or less (or in the optimum temperature or more). For example, when the temperature of the battery 140 decreases in the optimum temperature or less, movement of the lithium ions is reduced and/or the lithium ions become extinct due to electrolyte decomposition, fine side reactions, and reduction of a surface of a cathode material which occur inside the battery 140. Thus, the internal resistance of the battery 140 may increase. As another example, when the temperature of the battery 140 increases in the optimum temperature or more, the movement of the lithium ions is reduced and/or the lithium ions become extinct due to the electrolyte decomposition and lithium ion precipitation which occur inside the battery 140. Thus, the internal resistance of the battery 140 may increase.

Accordingly, to predict a change in the internal resistance of the battery 140, a change in the temperature of the battery 140 may be predicted. Further, to predict the change in the temperature of the battery 140, it is important to grasp an influence on the temperature of the battery 140 inside and outside the vehicle 100.

Referring back to FIG. 2, the energy management unit 132 may predict the change in the temperature of the battery 140 based on the driving data and the battery data.

The energy management unit 132 may predict the change in the temperature of the battery 140 in consideration of the outside temperature of the vehicle 100, the slope of the road on which the vehicle 100 drives, the surface condition of the road, and/or a current output of the driving system 150. The outside temperature of the vehicle 100 may increase the temperature of the battery 140 by conducting high heat from the air and the road to the vehicle 100. As the slope of the road increases or the surface condition of the road becomes more irregular, a gravitational force and/or a frictional force applied to the vehicle 100 increases, and thus to implement the same speed, it is required to increase the output of the driving system 150. In this way, heat generated by rotation and friction of the driving system 150 for high output, particularly, the motor, is conducted to the battery 140 to increase the temperature of the battery 140. Accordingly, the energy management unit 132 may predict that the temperature of the battery 140 increases as the outside temperature of the vehicle 100 becomes larger, the slope of the road becomes larger, the surface condition of the road becomes more irregular, and/or the current output of the driving system 150 becomes larger.

The energy management unit 132 may predict the change in the internal resistance of the battery 140 based on the predicted change in the temperature of the battery 140. The energy management unit 132 may predict that the internal resistance of the battery 140 increases when it is predicted that the temperature of the battery 140 decreases in the temperature range of the optimum temperature or less. For example, the energy management unit 132 may predict that the internal resistance of the battery 140 increases when a current temperature of the battery 140 identified based on the battery data is the optimum temperature or less and it is predicted based on the driving data that the temperature of the battery 140 decreases. The energy management unit 132 may predict that the internal resistance of the battery 140 increases when it is predicted that the temperature of the battery 140 increases in the temperature range of the optimum temperature or more. For example, the energy management unit 132 may predict that the internal resistance of the battery 140 increases when a current temperature of the battery 140 identified based on the battery data is the optimum temperature or more and it is predicted based on the driving data that the temperature of the battery 140 increases.

The energy management unit 132 may predict a degree of energy loss due to the predicted change in the internal resistance of the battery 140. Hereinafter, the energy loss caused by the increase in the internal resistance of the battery 140 will be described through FIG. 4.

Referring to a battery equivalent circuit diagram 410 of FIG. 4, heat loss energy Pheat1 may be generated by an internal resistance R1 of the battery 140 and an output current "I" from a voltage source "V". Accordingly, output energy P1 of the battery 140 may be calculated by Equation 1 below.

$$P_1 = V \cdot I - P_{heat1} \quad \text{[Equation 1]}$$

(In Equation 1, $P_1$ denotes the output energy of the battery 140, "V" denotes the voltage of the battery 140, "I" denotes the output current of the battery 140, and $P_{heat1}$ denotes heat loss energy caused by the internal resistance $R_1$).

An internal resistance $R_2$ of a battery equivalent circuit diagram 420 has a greater value than the internal resistance $R_1$ of the battery equivalent circuit diagram 410. In this case, heat loss energy $P_{heat2}$ generated by the internal resistance $R_2$ of the battery 140 and the output current "I" from the voltage source "V" may be greater than the heat loss energy $P_{heat1}$ generated by the internal resistance $R_1$. Accordingly, output energy $P_2$ of the battery 140, which is calculated by Equation 2 below, may be lower than the output energy $P_1$.

$$P_2 = V \cdot I - P_{heat2} \quad \text{[Equation 2]}$$

(In Equation 2, $P_2$ denotes the output energy of the battery 140, "V" denotes the voltage of the battery 140, "I" denotes the output current of the battery 140, and $P_{heat2}$ denotes heat loss energy caused by the internal resistance $R_2$).

In this way, when the internal resistance of the battery 140 increases, the heat loss energy due to the increased internal resistance increases, and thus the output energy of the battery 140 may decrease. Accordingly, when the increase in the internal resistance of the battery 140 is predicted, it is required to prevent a decrease in the output energy of the battery 140 by setting the output current of the battery 140 to be high.

Referring back to FIG. 2, the energy management unit 132 may predict a degree of the energy loss due to the change in the internal resistance of the battery 140 and may set the output current of the battery 140 based on the predicted degree of the energy loss. For example, the energy management unit 132 may set the output current of the battery 140 higher as the predicted degree of the energy loss becomes greater.

The energy management unit 132 may first set a preliminary output current of the battery 140 corresponding to the set output of the driving system 150 and an additional output current of the battery 140 based on the predicted degree of the energy loss and may set the output current based on these currents. The energy management unit 132 may set the preliminary output current of the battery 140 corresponding to the set output of the driving system 150 using a current map in which the plurality of output values of the driving system 150 and a plurality of output current values of the battery 140 are mapped. Here, the current map may be a table representing a theoretical output current of the battery 140 for producing the set output of the driving system 150 without considering the driving data. The energy management unit 132 may set the additional output current of the battery 140 according to the predicted degree of the energy loss. The output current of the battery 140 may be set by adding the preliminary output current and the additional output current.

Referring to FIG. 5, a graph 510 representing the output power of the battery 140 when the output current of the battery 140 is set without considering the driving environment and/or the driving condition of the vehicle 100 and a graph 520 representing the output power of the battery 140 when the computing system 130 sets the output current of the battery 140 may be identified.

According to the graph 510, in a section in which the speed of the vehicle 100 increases (a section from T1 to T2 or a section from T4 to T5), because it is difficult to grasp the energy loss due to the change in the internal resistance according to the driving environment, the output power of the battery 140 may be set to be excessively higher than the required power. Thereafter, in a section in which the speed of the vehicle 100 decreases (a section from T2 to T3 or a section from T5 to T6), the output power set to be excessively high may be reduced. That is, when the output power of the battery 140 is set without considering the driving environment and/or the driving condition, inefficiency in which the power used is excessively higher than the required power may occur as in the graph 510.

According to the graph 520, in a section in which the speed of the vehicle 100 increases (a section from T7 to T8 or a section from T9 to T10), the computing system 130 may predict the change in the internal resistance in consideration of the driving environment and/or the driving condition, may set the output current of the battery 140 based on the predicted change in the internal resistance, and thus may set the output power of the battery 140 to be similar to the required power. That is, when the output current of the battery 140 is set in consideration of the driving environment and/or the driving condition, the power used becomes similar to the required power as in the graph 520, and thus fuel efficiency of the vehicle 100 may be improved.

Figure 6:
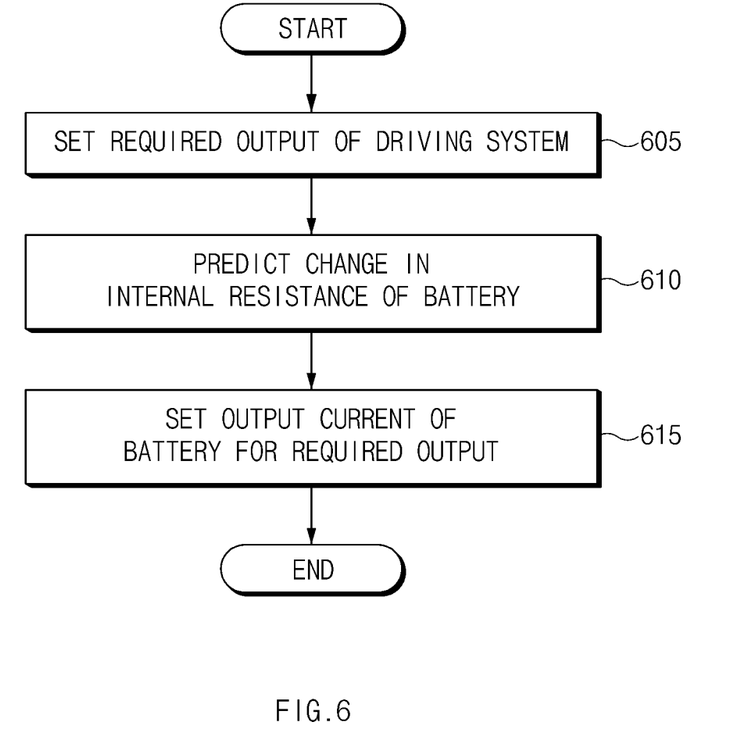
FIG. 6 is a flowchart of an operation of the computing system according to at least one aspect of the disclosure.

FIG. 6 is a flowchart of an operation of the computing system according to some embodiments. FIG. 6 may be described using the configurations of FIGS. 1 and 2.

The embodiment illustrated in FIG. 6 is merely one embodiment, a sequence of operations according to various embodiments of the disclosure may be different from that illustrated in FIG. 6. Further, some of the operations illustrated in FIG. 6 may be omitted, the sequence of the operations may be changed, or the operations may be merged.

Referring to FIG. 6, in operation 605, the computing system 130 may set the output of the driving system 150 (e.g., the motor). The computing system 130 may set the output based on the driving data and the characteristic data of the vehicle 100. Here, the characteristic data of the vehicle 100 may refer to data related to characteristics (e.g., a weight, types of components, and the like) according to the type of the vehicle 100.

The computing system 130 may set the output using the power map stored in the memory (not illustrated). The power map may be a table in which the plurality of output values of the driving system 150 are mapped with the driving data and the characteristic data. In detail, the power map may be a table in which a plurality of pieces of state information of a plurality of variables (e.g., the outside temperature, the slope of the road, the surface condition of the road, and the speed of the vehicle 100) included in the driving data and a plurality of pieces of state information of a plurality of variables (e.g., the weight and the type of the motor) included in the characteristic data are mapped with the plurality of output values of the driving system 150. For example, when the outside temperature on the power map is 35° C., the slope of the road is 15%, and the speed of the vehicle 100 is 120 km/h, the mapped output value of the driving system 150 may be "X". The computing system 130 may set the output of the driving system 150 to "X" when the driving environment and the driving condition identified based on the driving data are as described above.

In operation 610, the computing system 130 may predict the change in the internal resistance of the battery 140 based on the driving data and the battery data. For example, the computing system 130 may predict the change in the temperature of the battery 140 based on the driving data and the battery data and predict the change in the internal resistance of the battery 140 based on the predicted change in the temperature. In some embodiments the computing system 130 predicts the change in the internal resistance of the battery 140, such as described in more detail with reference to FIG. 7, herein.

In operation 615, the computing system 130 may set the output current of the battery 140 for the set output of the driving system 150 set in operation 605. For example, the computing system 130 may predict the degree of the energy loss based on the change in the internal resistance of the battery 140, which is predicted in operation 610, and may set the output current of the battery 140 based on the predicted degree of the energy loss. In some embodiments the computing system 130 sets the output current of the battery 140, such as described in more detail with reference to FIG. 8, herein. By setting the output current of the battery based on the predicted degree of the energy loss, the power output by the battery may be appropriately set to account for the current driving conditions of the vehicle, thereby avoiding the need to set the power output at a conservatively high level, which may waste the energy of the battery.

Figure 7:
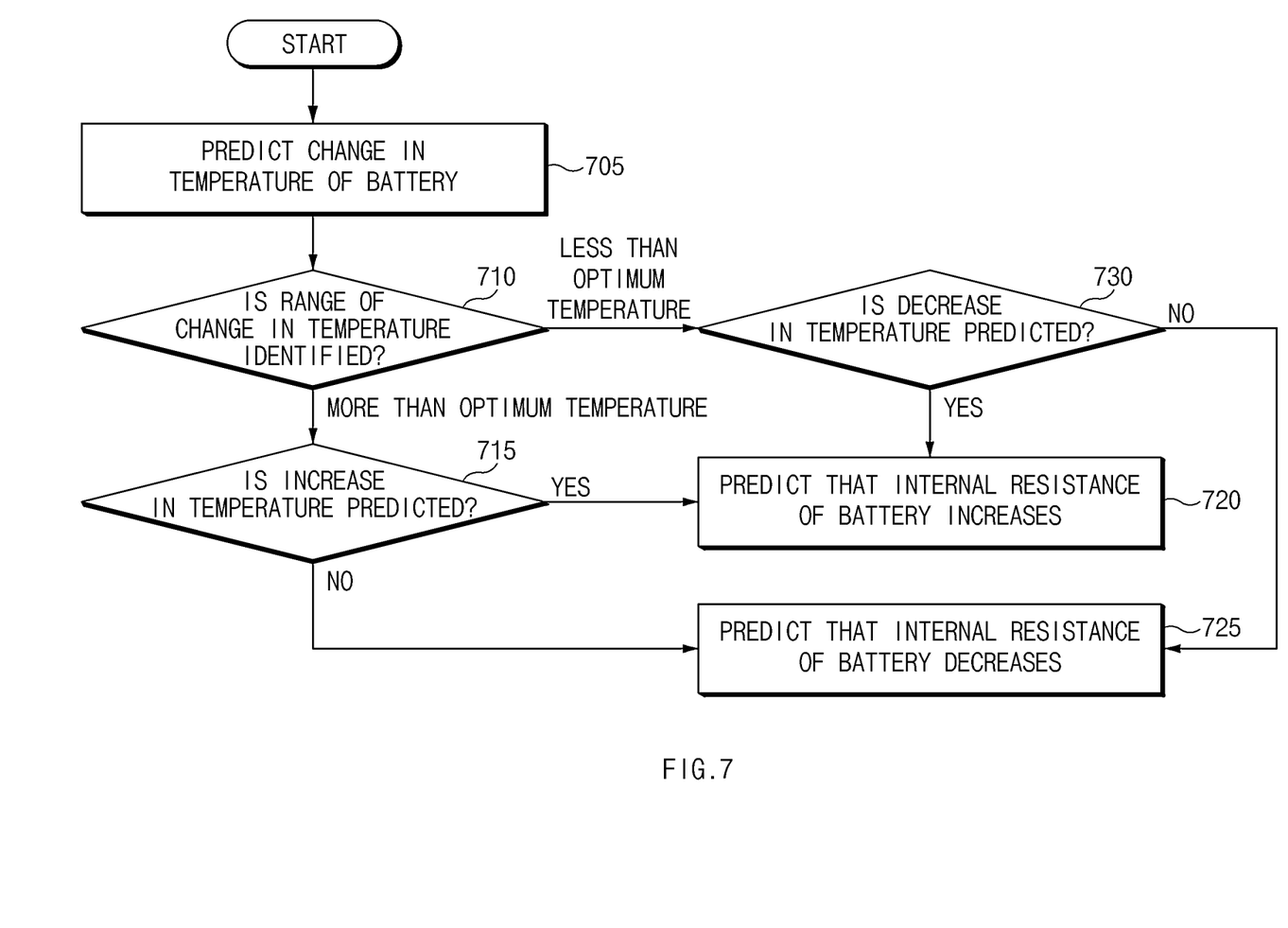
FIG. 7 is a flowchart of an operation of the computing system according to at least one aspect of the disclosure.

FIG. 7 is a flowchart of an operation of the computing system according to one or more embodiments. FIG. 7 may be described using the configurations of FIGS. 1 and 2.

The embodiment illustrated in FIG. 7 is merely one embodiment, a sequence of operations according to various embodiments of the disclosure may be different from that illustrated in FIG. 7. Further, some of the operations illustrated in FIG. 7 may be omitted, the sequence of the operations may be changed, or the operations may be merged.

Referring to FIG. 7, in operation 705, the computing system 130 may predict the change in the temperature of the battery 140 based on the driving data and the battery data.

According to at least one embodiment, the computing system 130 may predict the change in the temperature of the battery 140 in consideration of the outside temperature of the vehicle 100, the slope of the road on which the vehicle 100 drives, the surface condition of the road, and/or the current output of the driving system 150. The outside temperature of the vehicle 100 may increase the temperature of the battery 140 by conducting high heat from the air and the road to the vehicle 100. As the slope of the road increases or the surface condition of the road becomes more irregular, a gravitational force and/or a frictional force applied to the vehicle 100 increases, and thus to implement the same speed, it is required to increase the output of the driving system 150. In this way, the heat generated by the rotation and friction of the driving system 150 for high output, particularly, the motor, is conducted to the battery 140 to increase the temperature of the battery 140. Accordingly, the computing system 130 may predict that the temperature of the battery 140 increases as the outside temperature of the vehicle 100 becomes larger, the slope of the road becomes larger, the surface condition of the road becomes more irregular, and/or the current output of the driving system 150 becomes larger.

In operation 710, the computing system 130 may identify a range of the change in the temperature of the battery 140, which is predicted in operation 705. For example, the computing system 130 may identify that a range of the change in the temperature of the battery 140 is a range smaller than or equal to the optimum temperature when the current temperature of the battery 140 identified based on the battery data is the optimum temperature or less and it is predicted based on the driving data that the temperature of the battery 140 decreases. As another example, the computing system 130 may identify that the range of the change in the temperature of the battery 140 is a range greater than or equal to the optimum temperature when the current temperature of the battery 140 identified based on the battery data is the optimum temperature or more and it is predicted based on the driving data that the temperature of the battery 140 increases.

When it is identified in operation 710 that the range of the change in the temperature is greater than or equal to the optimum temperature, in operation 715, the computing system 130 may determine whether the temperature of the battery 140 is predicted to increase on operation 705.

When it is identified in operation 715 that the temperature of the battery 140 is predicted to increase ("YES"), in operation 720, the computing system 130 may predict that the internal resistance of the battery 140 increases.

When it is identified in operation 715 that the temperature of the battery 140 is predicted to decrease ("NO"), in operation 725, the computing system 130 may predict that the internal resistance of the battery 140 decreases.

When it is identified in operation 710 that the range of the change in the temperature is smaller than or equal to the optimum temperature, in operation 730, the computing system 130 may determine whether the temperature of the battery 140 is predicted to decrease in operation 705.

When it is identified in operation 730 that the temperature of the battery 140 is predicted to decrease ("YES"), in operation 720, the computing system 130 may predict that the internal resistance of the battery 140 increases.

When it is identified in operation 730 that the temperature of the battery 140 is predicted to increase ("NO"), in operation 725, the computing system 130 may predict that the internal resistance of the battery 140 decreases.

Figure 8:
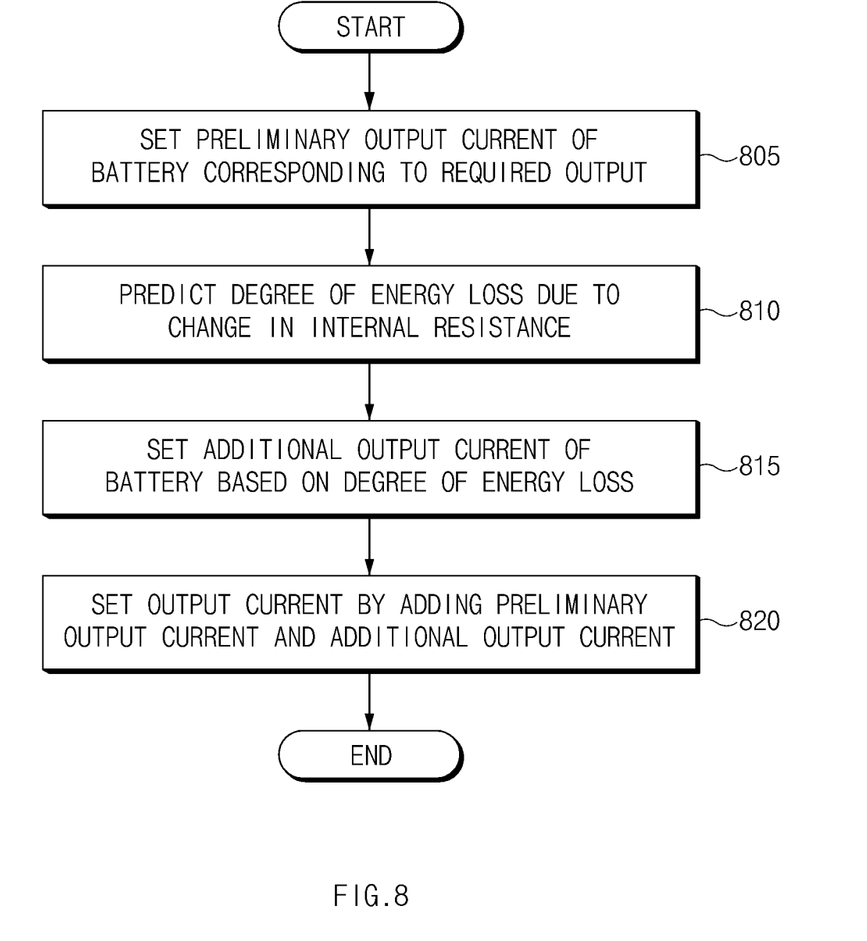
FIG. 8 is a flowchart of an operation of the computing system according to at least one aspect of the disclosure.

FIG. 8 is a flowchart of an operation of the computing system according to one or more embodiments. FIG. 8 may be described using the configurations of FIGS. 1 and 2.

The embodiment illustrated in FIG. 8 is merely one embodiment, a sequence of operations according to various embodiments of the disclosure may be different from that illustrated in FIG. 8. Further, some of the operations illustrated in FIG. 8 may be omitted, the sequence of the operations may be changed, or the operations may be merged.

Referring to FIG. 8, in operation 805, the computing system 130 may set the preliminary output current of the battery 140 corresponding to the set output of the driving system 150 set in operation 605 of FIG. 6. The computing system 130 may set the preliminary output current of the battery 140 corresponding to the set output of the driving system 150 using the current map in which the plurality of output values of the driving system 150 and the plurality of output current values of the battery 140 are mapped. Here, the current map may be a table representing a theoretical output current of the battery 140 for producing the set output of the driving system 150 without considering the driving data.

In operation 810, the computing system 130 may predict the degree of the energy loss due to the change in the internal resistance of the battery 140, which is predicted in operation 610 of FIG. 6.

In operation 815, the computing system 130 may set the additional output current of the battery 140 based on the degree of the energy loss, which is predicted in operation 810.

In operation 820, the computing system 130 may set the output current of the battery 140 by adding the preliminary output current set in operation 805 and the additional output current set in operation 815.

According to embodiments disclosed herein, a computing system that may control autonomous driving and also provide an energy management service based on battery data and a vehicle including the same may be provided.

According to embodiments disclosed herein, an output current of a battery is set in consideration of a change in an internal resistance of the battery according to a driving environment and/or a driving condition of the vehicle, and thus fuel efficiency of the vehicle may be improved.

Technical effects according to embodiments disclosed herein are not limited to the effects mentioned above, and other effects not mentioned may be clearly understood by those skilled in the art according to the disclosure of this disclosure.

The terms such as "comprise", "include", and "have" described above mean that the corresponding component may be included, unless there is a particularly contrary statement, and should be interpreted as further including another component, not excluding another component. Unless otherwise defined herein, all the terms used herein, which include technical or scientific terms, may have the same meaning that is generally understood by a person skilled in the art to which embodiments disclosed in the disclosure pertain. Terms commonly used, such as those defined in the dictionary, should be interpreted as having a meaning that is consistent with the meaning in the context of the related art and will not be interpreted as having an idealized or overly formal meaning unless expressly defined in in the disclosure.

Hereinabove, the above description is merely illustrative of the technical idea disclosed in the disclosure, and various modifications and variations may be made by one skilled in the art, to which the embodiments disclosed in the disclosure belong, without departing from the essential characteristic of the embodiments disclosed in the disclosure. Therefore, embodiments disclosed in the disclosure are intended not to limit but to explain the technical idea of embodiments disclosed in the disclosure, and the scope of the technical idea disclosed in the disclosure is not limited by these embodiments. The scope of protection disclosed in the disclosure should be construed by the attached claims, and all equivalents thereof should be construed as being included within the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A computing system comprising:
an autonomous driving controller configured to control autonomous driving of a vehicle by setting an output of a driving system of the vehicle; and
an energy management unit configured to:
predict a change in a temperature of a battery of the vehicle based on driving data of the vehicle and battery data of the battery;
determine whether a difference between the changed temperature of the battery and a predefined optimum temperature is predicted to be increasing relative to a difference between a current temperature of the battery and the predefined optimum temperature;
determine a change in an internal resistance of the battery based on the driving data, the battery data, the changed temperature of the battery, and whether the difference is predicted to be increasing; and
adjust an output current of the battery for the set output of the driving system based on the determined change in the internal resistance.

2. The computing system of claim 1, wherein the energy management unit is further configured to:
determine a degree of energy loss due to the determined change in the internal resistance, wherein adjusting the output current is further based on the determined degree of energy loss.

3. The computing system of claim 2, wherein the energy management unit is further configured to:
adjust the output current higher when the determined degree of energy loss increases.

4. The computing system of claim 2, wherein the energy management unit is further configured to:
set a preliminary output current of the battery corresponding to the set output of the driving system using a current map in which a plurality of output values of the driving system and a plurality of output current values of the battery are mapped;
set an additional output current of the battery based on the determined degree of the energy loss; and
adjust the output current to a sum of the preliminary output current and the additional output current.

5. The computing system of claim 1, wherein the energy management unit is configured to determine that the internal resistance of the battery is increasing when the changed temperature of the battery is (i) predicted to be greater than the predefined optimum temperature and (ii) greater than the current temperature of the battery.

6. The computing system of claim 1, wherein the energy management unit is configured to determine that the internal resistance of the battery is increasing when the changed temperature of the battery is (i) predicted to be less than the predefined optimum temperature and (ii) less than the current temperature of the battery.

7. The computing system of claim 1, wherein the driving data includes data related to at least one of an outside temperature of the vehicle, a slope of a road on which the vehicle drives, a surface condition of the road, or behavior data of the vehicle.

8. The computing system of claim 1, wherein the autonomous driving controller sets the output of the driving system based on the driving data and characteristic data of the vehicle.

9. The computing system of claim 8, wherein the autonomous driving controller sets the output of the driving system using a power map in which the driving data, the characteristic data of the vehicle, and a plurality of output values of the driving system are mapped.

10. The computing system of claim 1, wherein the determined change in the internal resistance is a prediction of internal resistance of the battery at a future time.

11. A method for adjusting operation of a battery of a vehicle, the method comprising:
receiving, by one or more processors, driving data of the vehicle and battery data of the battery;
predicting, by the one or more processors, a change in a temperature of the battery based on the driving data and the battery data;
determining, by the one or more processors, whether a difference between the changed temperature of the battery and a predefined optimum temperature is predicted to be increasing relative to a difference between a current temperature of the battery and the predefined optimum temperature;
determining, by the one or more processors, a change in an internal resistance of the battery based on the driving data, the battery data, the changed temperature of the battery and whether the difference is predicted to be increasing; and
adjusting, by the one or more processors, an output current of the battery for a set output of a driving system of the vehicle based on the determined change in the internal resistance.

12. The method of claim 11, further comprising:
determining a degree of energy loss due to the determined change in the internal resistance, wherein adjusting the output current is further based on the determined degree of energy loss.

13. The method of claim 12, further comprising:
adjusting the output current higher when the determined degree of energy loss increases.

14. The method of claim 12, further comprising:
setting a preliminary output current of the battery corresponding to the set output of the driving system using a current map in which a plurality of output values of the driving system and a plurality of output current values of the battery are mapped;
setting an additional output current of the battery based on the determined degree of the energy loss; and
adjusting the output current to a sum of the preliminary output current and the additional output current.

15. The method of claim 11, wherein determining the change in the internal resistance comprises:
determining that the internal resistance of the battery is increasing when the changed temperature of the battery is (i) predicted to be greater than the predefined optimum temperature and (ii) greater than the current temperature of the battery.

16. The method of claim 11, wherein determining the change in the internal resistance comprises:
determining that the internal resistance of the battery is increasing when the changed temperature of the battery is (i) predicted to be less than the predefined optimum temperature and (ii) less than the current temperature of the battery.

17. The method of claim 11, wherein the driving data includes data related to at least one of an outside temperature of the vehicle, a slope of a road on which the vehicle drives, a surface condition of the road, or behavior data of the vehicle.

18. The method of claim 11, further comprising:
setting the output of the driving system of the vehicle based on the driving data and characteristic data of the vehicle.

* * * * *